US012748742B2

(12) United States Patent
Eluri et al.

(10) Patent No.: US 12,748,742 B2
(45) Date of Patent: Sep. 29, 2026

(54) ASYNCHRONOUS HANDLING HINT BITS ON INDEX PAGES USING GARBAGE COLLECTION

(71) Applicant: Google LLC, Mountain View, CA (US)

(72) Inventors: Amarnadh Sai Eluri, Mountain House, CA (US); Vinay Sharma, Bangalore (IN); Prathibha Bisarahalli, Bengaluru (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/177,239

(22) Filed: Apr. 11, 2025

(65) Prior Publication Data

US 2025/0328511 A1 Oct. 23, 2025

Related U.S. Application Data

(60) Provisional application No. 63/635,575, filed on Apr. 17, 2024.

(51) Int. Cl.
*G06F 16/22* (2019.01)
*G06F 12/02* (2006.01)

(52) U.S. Cl.
CPC ...... *G06F 16/2246* (2019.01); *G06F 12/0253* (2013.01)

(58) Field of Classification Search
CPC .......................... G06F 16/2246; G06F 12/0253
USPC ........................................................... 707/797
See application file for complete search history.

(56) References Cited

U.S. PATENT DOCUMENTS 6,085,296 A * 7/2000 Karkhanis ........... G06F 12/1009 711/147
6,324,631 B1 * 11/2001 Kuiper .................. G06F 12/023 711/170
6,594,667 B2 * 7/2003 Dahlen ................... G06F 16/22
6,804,766 B1 * 10/2004 Noel ................... G06F 12/1036 711/208
6,886,085 B1 * 4/2005 Shuf ..................... G06F 12/121 711/143
7,395,278 B2 * 7/2008 Zwilling ............. G06F 11/1451
7,403,945 B2 * 7/2008 Lin ...................... G06F 16/2343
8,255,591 B2 * 8/2012 Bohrer .................... G06F 13/28 710/22
9,645,844 B2 * 5/2017 Zhang ................... G06F 16/128
9,690,699 B1 * 6/2017 Nemes .................. G06F 12/123
10,255,309 B2 * 4/2019 Blanco .................. G06F 16/221

(Continued)

*Primary Examiner* — Hanh B Thai
(74) *Attorney, Agent, or Firm* — Shumaker & Sieffert, P.A.

(57) ABSTRACT

A system includes data processing hardware and memory hardware. The memory hardware store instructions that cause the data processing hardware to obtain one or more hint bits for a B-tree index page of a database, each hint bit representing a status of a corresponding tuple of the B-tree index page and determine, using the one or more hint bits, that a threshold amount of tuples of the B-tree index page are dead. Responsive to determining that the threshold amount of tuples of the B-tree index page are dead, the instructions cause the data processing hardware to generate a list of dead tuples, determine, based on the list of dead tuples, a transaction identifier, delete, from the B-tree index page, each tuple in the list of dead tuples, and generate, using the transaction ID, a write-ahead logging record for the deletion of each tuple in the list of dead tuples.

20 Claims, 4 Drawing Sheets

(56) References Cited

U.S. PATENT DOCUMENTS

| | | | | |
|---|---|---|---|---|
| 10,733,164 | B2 * | 8/2020 | Hopcroft | G06F 16/2237 |
| 10,747,679 | B1 * | 8/2020 | Larson | G06F 12/1027 |
| 11,093,387 | B1 * | 8/2021 | Chinthekindi | G06F 3/0646 |
| 11,281,639 | B2 * | 3/2022 | Hopcroft | G06F 16/215 |
| 11,392,568 | B2 * | 7/2022 | Hopcroft | G06F 16/2453 |
| 12,271,625 | B1 * | 4/2025 | Astolfi | G06F 3/0656 |
| 2006/0167960 | A1 * | 7/2006 | Lomet | G06F 16/2322 |
| 2008/0082721 | A1 * | 4/2008 | Yu | G06F 12/0864 711/3 |
| 2008/0235298 | A1 * | 9/2008 | Lin | G06F 16/2343 |
| 2011/0302194 | A1 * | 12/2011 | Gonzalez | G06F 16/29 707/769 |
| 2014/0081927 | A1 * | 3/2014 | Lipcon | G06F 16/215 707/692 |
| 2017/0177365 | A1 * | 6/2017 | Doshi | G06F 9/30043 |
| 2017/0277635 | A1 * | 9/2017 | Ma | G06F 9/467 |
| 2018/0060369 | A1 * | 3/2018 | Dietterich | G06F 12/0261 |
| 2019/0171721 | A1 * | 6/2019 | Oukid | G06F 11/1474 |
| 2020/0142878 | A1 * | 5/2020 | Varadarajan | G06F 7/14 |
| 2020/0327097 | A1 * | 10/2020 | Birka | G06F 16/1734 |
| 2021/0055966 | A1 * | 2/2021 | Della Monica | G06F 3/0659 |
| 2022/0050792 | A1 * | 2/2022 | Campbell | G06F 12/1045 |
| 2023/0008732 | A1 * | 1/2023 | Birka | G06F 16/1734 |
| 2024/0037118 | A1 * | 2/2024 | Grosman | G06F 16/27 |
| 2024/0078179 | A1 * | 3/2024 | Zuo | G06F 3/061 |
| 2024/0370426 | A1 * | 11/2024 | He | G06F 16/2365 |
| 2025/0209007 | A1 * | 6/2025 | Horsnell | G06F 12/0828 |

* cited by examiner

ASYNCHRONOUS HANDLING HINT BITS ON INDEX PAGES USING GARBAGE COLLECTION

RELATED APPLICATION

This application claims benefit to U.S. Provisional Application No. 63/635,575, filed Apr. 17, 2024, the entire contents incorporated herewith.

TECHNICAL FIELD

This disclosure relates to asynchronous handling of hint bits on index pages using garbage collection.

BACKGROUND

B-tree indexes are a self-balancing data tree structure used by many databases. Some databases with B-tree indexes do not store any data tuple visibility information. Therefore index scans often have to visit the corresponding table of a database (or visibility map for index only scans) to determine visibility of a B-tree index tuple.

DESCRIPTION OF DRAWINGS

Like reference symbols in the various drawings indicate like elements.

DETAILED DESCRIPTION

Figure 1:
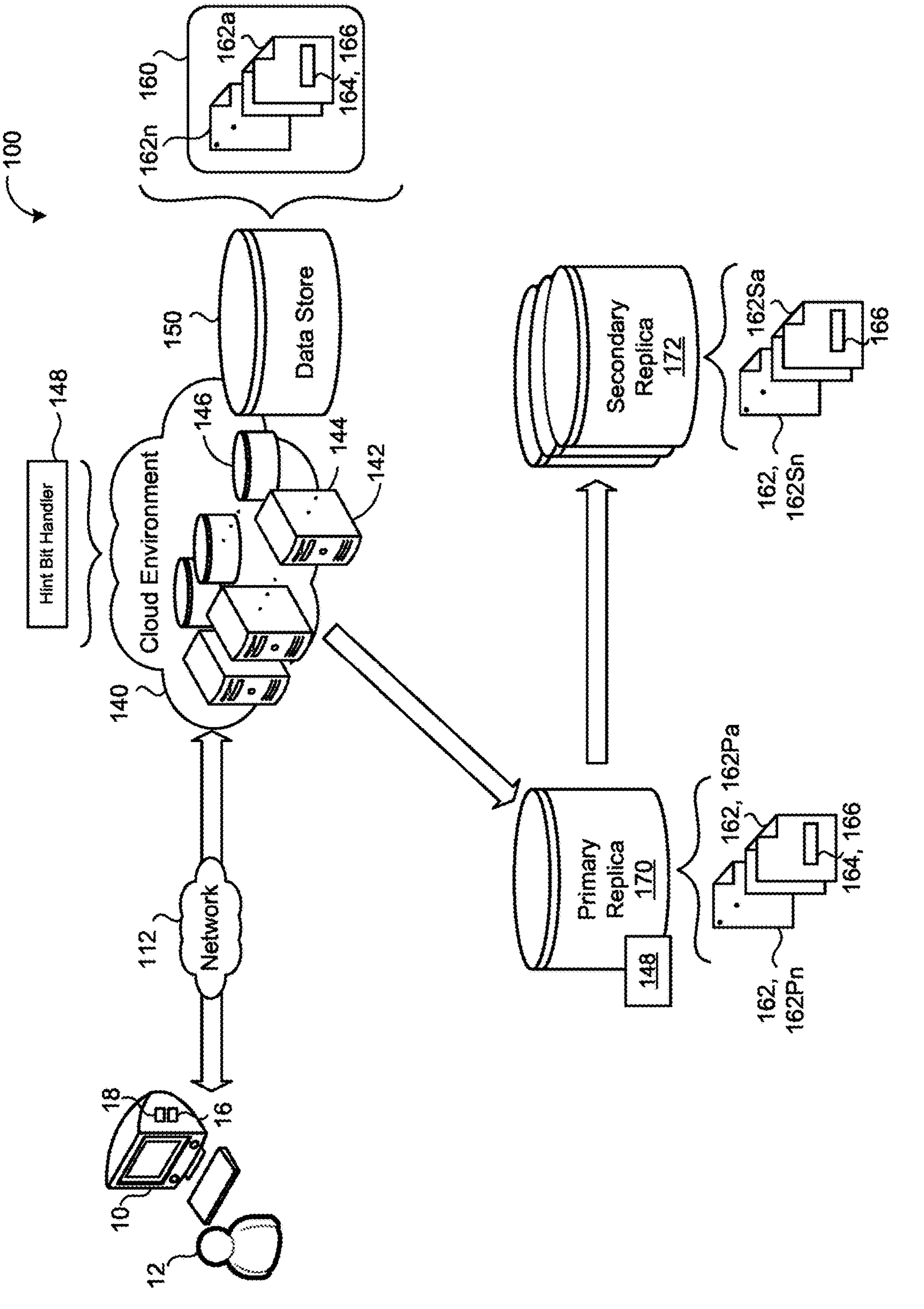
FIG. 1 is a schematic view of an example system for asynchronous handling of hint bits.

B-tree indexes are a self-balancing data tree structure used by many databases. Some databases (e.g., POSTGRESQL®) with B-tree indexes do not store any data/heap tuple visibility information. Therefore index scans often have to visit the corresponding table of a database (or visibility map for index only scans) to determine visibility of a B-tree index tuple.

Reading the corresponding table page is often computationally expensive as the read may require IO from downstream storage, a read lock on the page, etc. Moreover, the corresponding table page has to be read for each B-tree index tuple which qualifies the filter predicate for index scans. Because qualifying B-tree index tuples may belong to different table pages, the resulting access pattern of table pages is also often random in nature, making IO, if any, worse. While index scans can visit a table for other reasons as well (e.g., reporting non-key columns), the visibility test is necessary for all the B-tree index tuples which qualify the filter predicate, and therefore generally is a common occurrence. This may not necessarily always be the case for index only scans, as the visibility-map may be consulted. However, if the tuple is dead, then the table has to be visited, as the visibility map will be insufficient.

To alleviate part of this problem, some databases employ an approach which avoids table visits for B-tree index tuples which are invisible to all transactions. In other words, dead B-tree index tuples are lazily marked dead and subsequently ignored by index scans on the primary node (RW node) of a database cluster. A hint bit (e.g., "LP_DEAD") may be used to denote whether a tuple is dead or not in a B-tree index leaf page. However, B-tree index scans on read replicas ignore hint bits (e.g., "LP_DEAD"). That is, the table is visited even if this hint bit is set. This is to avoid correctness issues, as these hint bits are set by the primary node when a B-tree index tuple is dead on the primary node, however, the same B-tree index tuple might still be visible to a transaction running on the replica.

This leads to performance degradation on the replica when the B-tree index contains a significant amount of dead tuples as this results in a significant number of table page reads. Even though garbage collection jobs periodically garbage collect dead tuples, including dead B-tree index tuples, this is not sufficient, especially when the rate of garbage accumulation is high. Also, because garbage collection is a resource intensive operation which requires a super-exclusive lock on pages and must scan the entire table multiple times, it is generally not possible to run conventional garbage collection frequently enough to account for this issue. For large databases, a single garbage collection run can require a significant amount of time.

Furthermore, B-tree indexes of some databases also support inline garbage collection, where when a particular B-tree page does not have sufficient free space to accommodate a new tuple during insertion, then dead tuples are physically deleted from the page to make space for the new tuple. This also happens when inserting a tuple in a dead posting list. However, this is also generally not enough to keep up with the rate of garbage accumulation for high throughput workloads. In some databases, cloud pages are materialized by the underlying storage engine using write-ahead logging (WAL) records, therefore non-WAL logged hint bits (such as LP_DEAD) are not present in the pages materialized by the storage engine. Therefore, if evicted out of database-level caches, tiered cache will lose hint bits for B-tree index pages containing hint bits to denote dead tuples, because the page will have to be read from the storage engine later on, which does not contain this information. A restart and/or maintenance operation may also lead to loss of hint bits for pages present in buffer cache and database tiered cache.

Accordingly, there are two major problems with these hint bits. First, hint bits cannot be used in a read replica to skip dead tuples in a B-tree index. Second, in some databases, these hint bits can be lost in the primary node (i.e., the RW node).

Implementations herein include a garbage collector that garbage collects and/or physically deletes tuples marked dead with a hint bit (e.g., LP_DEAD) in a B-tree index as soon as possible. Because physical deletion of a tuple in a permanent B-tree index is WAL-logged, this will propagate to the read replica, and a table access will be avoided on the replica. Loss of hint bits on the primary node will also be reduced, as physical deletion is WAL-logged and will be propagated to the underlying storage engine.

The approach includes a walkthrough of a shared buffers cache of a database to garbage collect dead tuples from B-tree leaf pages. The approach also includes garbage collecting dead tuples from B-tree leaf pages evicted from the database's shared buffers cache. Because a B-tree index tuple can only be marked dead once it is in the shared buffers cache, it may be assumed that garbage is only accumulated in the shared buffers. Thus, this approach avoids any garbage leak by garbage collecting evicted B-tree pages and periodically reduces the amount of garbage in the shared buffers cache itself. This way, all of the garbage in B-tree leaf pages (e.g., LP_DEAD marked tuples) is accounted for.

Generally speaking, it is not reasonable to garbage collect all dead tuples using this approach, as garbage collection also comes with a cost. For example, when a frequently accessed B-tree page has 100 tuples and only one tuple is marked dead, the cost of garbage collecting this tuple (e.g., taking a write lock, etc.) may be much more than the benefit garbage collection can provide to queries by avoiding table access for this particular tuple. Therefore, implementations herein include a set of criteria to qualify a page for garbage collection, which depends on multiple configurable thresholds.

Once a page is qualified for garbage collection, as discussed in more detail below, then the garbage collector opens the corresponding table and index relation with an exclusive intent (i.e., an intent to modify the index pages). The garbage collector pins the B-tree buffer and acquires a write lock on the same. The garbage collector scans the B-tree leaf page to make a list of all dead tuples. The garbage collector visits the table for each of the dead tuples to determine a transaction identifier (ID) using deleted transaction IDs (e.g., xmax values) of table tuples. In some examples, dead line pointers are not considered. The garbage collector deletes the dead items from the B-tree leaf page and generates a WAL record with the previously discussed transaction ID to raise a recovery conflict on the replica if necessary. Optionally, only WAL-logged B-tree indexes are considered for garbage collection.

For some databases, flushing (i.e., writing to disk) a page is a necessary requirement before evicting it from the shared buffers cache. The garbage collector may leverage this requirement by registering a qualifying page for garbage collection during flush, as it may not be feasible to perform garbage collection during a flush or eviction itself given that garbage collection can take a significant amount of time, thereby increasing the time taken to flush or evict a page, which potentially degrades performance of some workloads.

Registering a page for garbage collection as used herein is defined as pushing a buffer tag that uniquely identifies a page in the database cluster into a shared memory queue. This queue is periodically read by database level workers to find candidates for garbage collection. In other words, database level workers (as described in more detail below) may read buffer tags from this queue and then read the B-tree leaf page denoted by the buffer tag, if not already in the database shared buffers cache, before finally garbage collecting dead B-tree index tuples from the page. There is a possibility that this shared memory queue may get full, and in such cases, qualifying B-tree buffer tags may not be added to this queue and therefore will be skipped.

During database startup, a background worker/process (i.e., a launcher process) may be started that is responsible for spawning more workers/processes to garbage collect B-tree leaf pages. The launcher process periodically analyzes statistics to determine if garbage collection is sufficiently valuable. When garbage collection is deemed worthwhile, then database level workers will be spawned (e.g., one at a time) for top-K qualifying databases using statistics.

Each database level worker may perform a number of tasks. For example, each database level worker may connect to the appropriate database, garbage collect B-tree leaf pages corresponding to the buffer tags present in the shared memory queue that belong to the connected database, and walk over the database shared buffers cache and garbage collect qualifying B-tree leaf pages belonging to the connected database. Meanwhile, the launcher process may wait for the database level workers to finish with a configurable timeout enforced on each database level worker.

In some implementations, a B-tree leaf page is qualified for garbage collection when one or more of the following is true: the percentage of dead tuples (marked dead via a hint bit) in the B-tree leaf page is greater than a configurable threshold (e.g., 5%) or an amount of free space in the page is less than the average size of tuples in the B-tree leaf page and there is at least one dead tuple (i.e., the page is full and contains at least one dead tuple). Moreover, hints bits in a database's internal page level structures (e.g., buffer descriptor, etc.) may be used to determine whether the page even has garbage. This helps in quickly skipping pages which do not contain any garbage. These hint bits help determine whether the page is indeed a B-tree leaf page and contains at least one dead tuple. Because some of these hint bits are present in the internal page level structures (like buffer descriptor, etc.), a quick check may be performed without any pin and a full check may be performed after pinning the buffer if the quick check passes.

Scanning shared buffers is a costly CPU-intensive operation, and it is not ideal to walk over all the shared buffers when there is not enough garbage to justify doing the same. Therefore, in some implementations, statistics are used to determine if it will be worthwhile walking over the shared buffers cache to garbage collect qualifying buffers. One such statistic may be the cumulative count of dead tuples in all B-tree indexes across the cluster (for all databases). This count is always increasing, and the launcher process may determine a difference between the current value and the value recorded during the last successful run. When this difference satisfies a configurable threshold, then it may be deemed worthwhile to start one or more database level workers for qualifying databases.

Thus, implementations herein solve the previously discussed problems where hint bits cannot be used to read replicas to skip dead tuples in a B-tree index and hint bits being lost in the primary node. In addition, implementations herein provide index level garbage collection or vacuuming. The application programming interfaces (APIs) operating on a B-tree index page may be utilized to vacuum/garbage collect an entire B-tree index without having to scan the entire corresponding table. Such an operation can be faster than table level vacuum operation and alleviate performance issues without having to wait for table level vacuum operation. Additionally, insert performance is improved. When inserting a tuple into a B-tree leaf page, when no space is available, then some databases will delete dead tuples in the B-tree leaf page to make space for the new tuple. With implementations herein, this inline garbage collection during insert would not happen as frequently as it otherwise would because the number of dead tuples is significantly less, leading to improvements in insert latency.

Referring now to FIG. 1, in some implementations, a distributed database system 100 (also referred to herein as "computing system 100") includes a distributed database 140 in communication with one or more user devices 10 via a network 112. The user device 10 may correspond to any computing device, such as a desktop workstation, a laptop workstation, or a mobile device (i.e., a smart phone) that can be used to access a cloud-based distributed database (e.g., distributed database 140). The user device 10 includes computing resources 18 (e.g., data processing hardware) and/or storage resources 16 (e.g., memory hardware).

The distributed database 140 is a distributed system (e.g., a cloud environment using multiple computers/servers) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to any number of tables or databases for any number of users.

Figure 2:
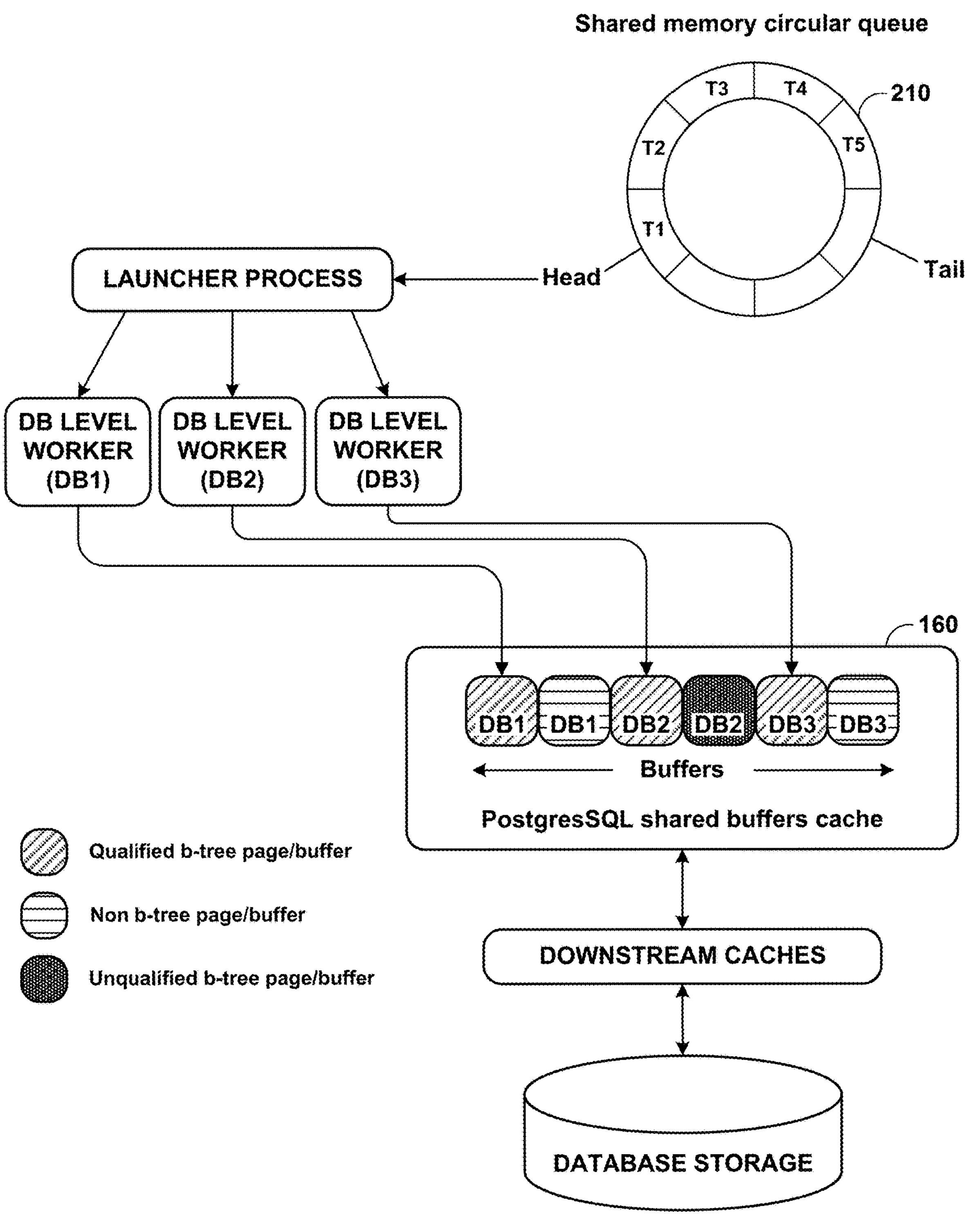
FIG. 2 is a schematic view of exemplary components of the system of FIG. 1.

The data store 150 also stored one or more caches, such as a shared buffer cache 160 (FIG. 2) that each stores one or more B-tree index pages 162, 162*a-n*. Each B-tree index page 162 includes hint bits 164 that represent a status of a corresponding tuple 166 of the B-tree index page 162.

The distributed database system 100 includes a primary node 170 (also referred to as a primary replica or RW node or primary instance) and one or more secondary node 172 (also referred to as a secondary instance or secondary replica) for each database. Generally speaking, the primary node 170 (i.e., the primary node or RW node) executes and commits transactions and then asynchronously these transactions are sent to be re-executed or applied to the secondary node(s) 172. The primary node 170 may include B-tree index pages 162, 162Pa-n that include hint bits 164 and corresponding tuples 166 while the secondary node includes B-tree index pages 162, 162S-n that only include tuples 166 (and no or less hint bits).

The distributed database system 100 includes a hint bit handler 148. In some implementations, the hint bit handler 148 executes at the primary node 170. The hint bit handler 148 determines, using the hint bits 164 of the primary node 170, that a threshold amount of tuples 166 of a B-tree index page 162P of the primary node are dead. In some examples, the hint bit is an "LP_DEAD" hint bit. Dead tuples 166 refer to tuples 166 that are not referenced in the current version of a table, but still occupy space on disk.

The hint bit handler 148, based on determining that the threshold amount of tuples 166 are dead, generates, using the B-tree index page 162P, a list of dead tuples 166. The hint bit handler 148 determines, based on each tuple 166 in the list of dead tuples 166, a transaction identifier (ID). The transaction ID identifies the last transaction to modify the tuple 166. In some examples, the hint bit handler 148 determines the transaction ID by determining the transaction ID of the transaction that deleted the corresponding tuple 166.

The hint bit handler 148 deletes, from the B-tree index page 162P, each tuple 166 in the list of dead tuples 166. The hint bit handler 148 also generates, using the transaction ID, a write-ahead logging (WAL) record for the deletion of each tuple 166 in the list of dead tuples 166. Because these deletions are WAL-logged, they will propagate to the secondary nodes 172 where the dead tuples 166 may also be marked dead and/or deleted.

In some implementations, the hint bit handler 148 determines that a B-tree index page 162P is evicted from the shared buffer cache 160 and, based on determining that the B-tree index page 162P is evicted from the shared buffer cache 160, the hint bit handler 148 generates, using the B-tree index page 162P, a list of dead tuples 166. The hint bit handler 148 determines, based on each tuple 166 in the list of dead tuples 166, a transaction identifier ID and deletes, from the B-tree index page 162P, each tuple 166 in the list of dead tuples 166. The hint bit handler generates, using the transaction ID, a WAL record for the deletion of each tuple 166 in the list of dead tuples 166. The hint bit handler may determine that the B-tree index page 162P is evicted and track the eviction by pushing a buffer tag uniquely identifying the second B-tree index page 162P into a queue 210 (FIG. 2), such as a circular queue. The circular queue may lockless reads to prevent batch-reading garbage collection processes from contending with other database processes. The hint bit handler 148 may then read, from the queue, the buffer tag and, based on reading the buffer tag, retrieve the B-tree index page 162P.

In some examples, the hint bit handler 148 determines that a B-tree index page 162P is full and has at least one dead tuple 166. Based on determining this, the hint bit handler 148 may generate, using the B-tree index page 162P, a list of dead tuples 166. The hint bit handler 148 may determine, based on each tuple 166 in the list of dead tuples 166, a transaction identifier (ID). That is, the transaction ID may be determined from the dead tuples 166 (i.e., to take the max of transaction IDs). The hint bit handler 148 may delete, from the B-tree index page 162P, each tuple 166 in the list of dead tuples 166 and generate, using the transaction ID, a WAL record for the deletion of each tuple 166 in the list of dead tuples 166.

In some examples, the hint bit handler 148 determines that a second threshold amount of tuples 166 of the plurality of B-tree index pages 162P are dead and deletes each tuple 166 in the list of dead tuples 166 further based on determining that the second threshold amount of tuples 166 of the of B-tree index pages 162P are dead. In some implementations, the hint bit handler 148, in response to determining that the second threshold amount of tuples 166 are dead, launches one or more database-level workers which will perform garbage collection on the pages (i.e., delete the dead tuples 166). The hint bit handler 148 may determine that the second threshold amount of tuples 166 are dead by comparing a current cumulative count of dead tuples 166 with a past cumulative count of dead tuples 166.

In some examples, the hint bit handler 148 may enforce a timeout when identifying or deleting dead tuples takes longer than a timeout threshold period of time. For example, the hint bit handler 148, while generating a list of dead tuples 166, determines that a threshold amount of time has passed, and based on the threshold period of time passing, halts generation of the list of dead tuples. Optionally, this timeout is enforced on one or more database level workers. That is, when one or more database level workers take longer than the threshold period of time walking over the shared buffer cache 160, the worker(s) may be halted.

Figure 3:
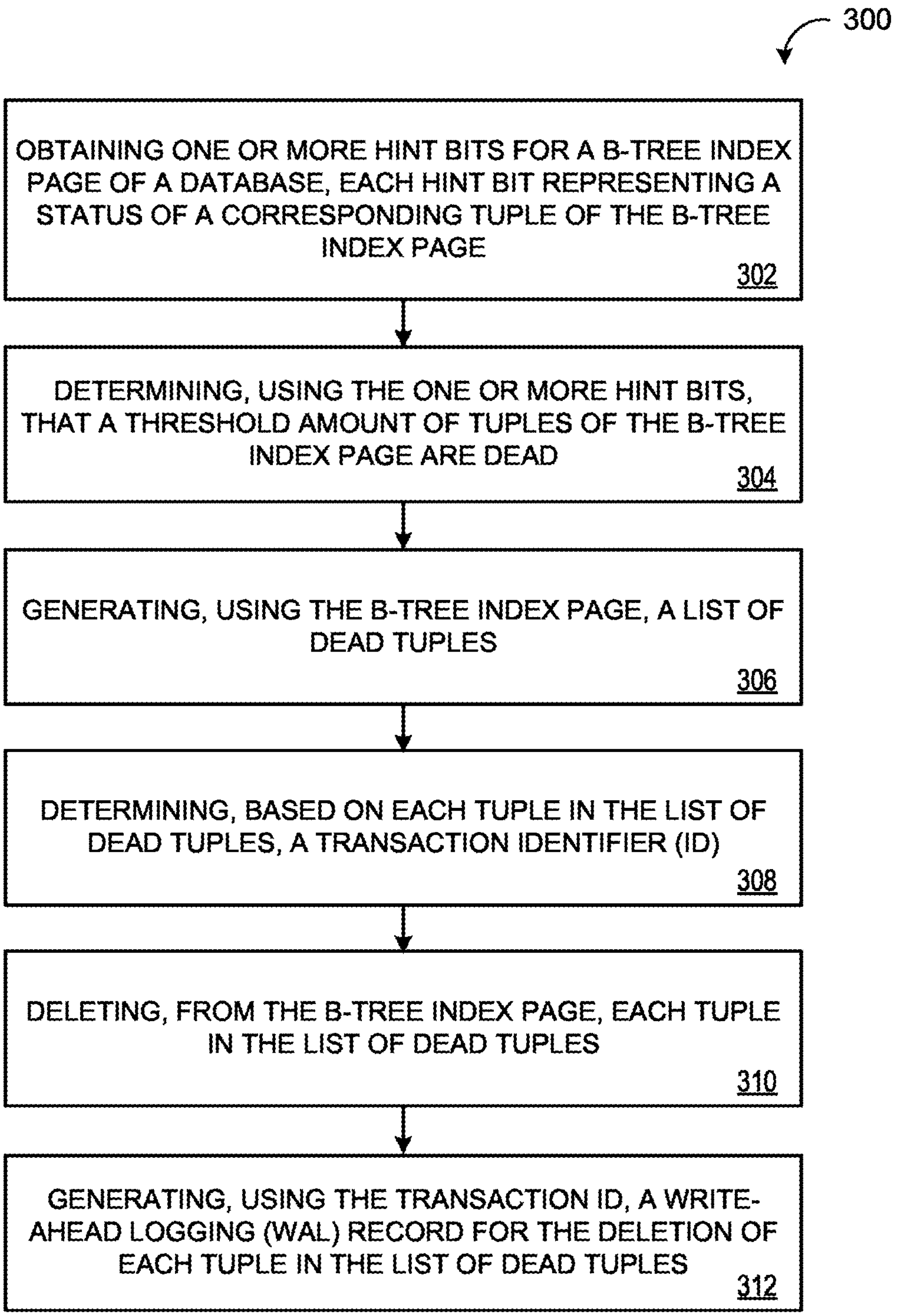
FIG. 3 is a flowchart of an example arrangement of operations for a method of asynchronous handling of hint bits.

FIG. 3 is a flowchart of an exemplary arrangement of operations for a method 300 of asynchronously handling hint bits. The computer-implemented method 300, when executed by data processing hardware, causes the data processing hardware to perform operations. The method 300, at operation 302, includes obtaining one or more hint bits 164 for a B-tree index B-tree index page 162. The B-tree index page 162 may be stored at a shared buffer cache 160 that stores one or more B-tree index pages 162 for one or more tables or databases. The method 300, at operation 304, includes determining, using the one or more hint bits 164, that a threshold amount of tuples 166 of the B-tree index page 162 are dead. At operation 306, the method 300 includes, based on determining that the threshold amount of tuples 166 of the B-tree index page 162 are dead, generating, using the B-tree index page 162, a list of dead tuples 166. At operation 308, the method 300 includes determining, based on each tuple 166 in the list of dead tuples 166, a transaction identifier (ID). At operation 310, the method 300 includes deleting, from the B-tree index page 162, each tuple 166 in the list of dead tuples 166. The method 300, at operation 312, includes generating, using the transaction ID, a write-ahead logging (WAL) record for the deletion of each tuple 166 in the list of dead tuples 166.

Figure 4:
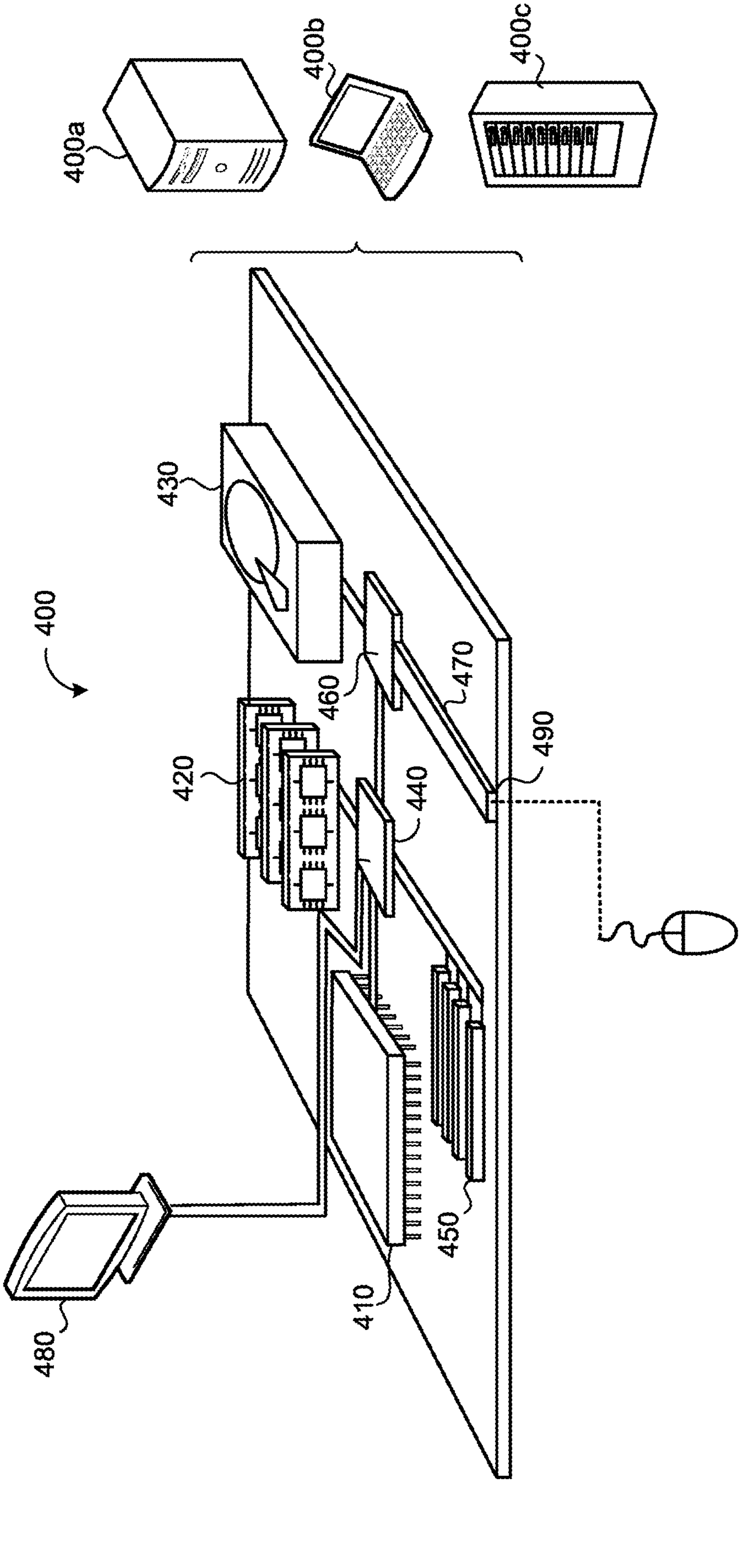
FIG. 4 is a schematic view of an example computing device that may be used to implement the systems and methods described herein.

FIG. 4 is a schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in or otherwise encoded on the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Non-transitory memory 420 may, in some examples, be a non-transitory computer-readable storage medium that is encoded with instructions. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more techniques, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400*a* or multiple times in a group of such servers 400*a*, as a laptop computer 400*b*, or as part of a rack server system 400*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:

obtaining, by a computing system, one or more hint bits for a B-tree index page of a database, each hint bit of the one or more hint bits representing a status of a corresponding tuple of the B-tree index page;

determining, by the computing system and using the one or more hint bits, that a threshold amount of tuples of the B-tree index page are dead;

responsive to determining that the threshold amount of tuples of the B-tree index page are dead:

generating, by the computing system and using the B-tree index page, a list of dead tuples;

determining, by the computing system and based on each tuple in the list of dead tuples, a transaction identifier;

deleting, by the computing system and from the B-tree index page, each tuple in the list of dead tuples; and generating, by the computing system and using the transaction identifier, a write-ahead logging record for the deletion of each tuple in the list of dead tuples; and propagating the write-ahead logging record to one or more secondary nodes of the database to enable the one or more secondary nodes to delete each tuple in the list of dead tuples.

2. The method of claim 1, wherein determining the transaction identifier comprises determining, for each respective tuple in the list of dead tuples, an identifier of a transaction that deleted the respective tuple.

3. The method of claim 1, further comprising:

determining, by the computing system, that a second B-tree index page of the database is evicted from a shared buffer cache; and responsive to determining that the second B-tree index page is evicted from the shared buffer cache:

generating, by the computing system and using the second B-tree index page, a second list of dead tuples;

determining, by the computing system and based on each tuple in the second list of dead tuples, a second transaction identifier;

deleting, by the computing system and from the second B-tree index page, each tuple in the second list of dead tuples; and generating, by the computing system and using the second transaction identifier, a second write-ahead logging record for the deletion of each tuple in the second list of dead tuples.

4. The method of claim 3, wherein determining that the second B-tree index page of the database is evicted from a shared buffer cache comprises:

pushing, by the computing system, a buffer tag uniquely identifying the second B-tree index page of the database into a queue;

reading, by the computing system and from the queue, the buffer tag; and responsive to reading the buffer tag, retrieving, by the computing system, the second B-tree index page.

5. The method of claim 1, further comprising:

determining, by the computing system, that a second B-tree index page of the database is full and has at least one dead tuple; and responsive to determining that the second B-tree index page is full and has at least one dead tuple:

generating, by the computing system and using the second B-tree index page, a second list of dead tuples;

determining, by the computing system and based on each tuple in the second list of dead tuples, a second transaction identifier;

deleting, by the computing system and from the second B-tree index page, each tuple in the second list of dead tuples; and generating, by the computing system and using the second transaction identifier, a second write-ahead logging record for the deletion of each tuple in the second list of dead tuples.

6. The method of claim 1, further comprising:

determining, by the computing system, that a second threshold amount of tuples of a plurality of B-tree index pages are dead; and deleting, by the computing system, each tuple in the list of dead tuples is further based on determining that the second threshold amount of tuples of the plurality of B-tree index pages are dead.

7. The method of claim 6, wherein determining that the second threshold amount of tuples of the plurality of B-tree index pages are dead comprises comparing a current cumulative count of dead tuples with a past cumulative count of dead tuples.

8. The method of claim 1, further comprising:

determining, by the computing system and using the one or more hint bits, that the threshold amount of tuples of a second B-tree index page are dead;

responsive to determining that the threshold amount of tuples of the second B-tree index page are dead, generating, by the computing system and using the B-tree index page, a second list of dead tuples;

while generating the second list of dead tuples, determining, by the computing system, that a threshold amount of time has passed; and responsive to determining that the threshold amount of time has passed, halting, by the computing system, generation of the second list of dead tuples.

9. The method of claim 1, wherein:

the B-tree index page is stored at a shared buffer cache; and the shared buffer cache stores a plurality of B-tree index pages for a plurality of databases.

10. A system comprising:

data processing hardware; and memory hardware in communication with the data processing hardware, the memory hardware storing instructions that when executed on the data processing hardware cause the data processing hardware to:

obtain one or more hint bits for a B-tree index page of a database, each hint bit of the one or more hint bits representing a status of a corresponding tuple of the B-tree index page;

determine, using the one or more hint bits, that a threshold amount of tuples of the B-tree index page are dead;

responsive to the determination that the threshold amount of tuples of the B-tree index page are dead:

generate, using the B-tree index page, a list of dead tuples;

determine, based on each tuple in the list of dead tuples, a transaction identifier;

delete, from the B-tree index page, each tuple in the list of dead tuples; and generate, using the transaction identifier, a write-ahead logging record for the deletion of each tuple in the list of dead tuples; and propagate the write-ahead logging record to one or more secondary nodes of the database to enable the one or more secondary nodes to delete each tuple in the list of dead tuples.

11. The system of claim 10, wherein the instructions that cause the data processing hardware to determine the transaction identifier further cause the data processing hardware to determine, for each respective tuple in the list of dead tuples, an identifier of a transaction that deleted the respective tuple.

12. The system of claim 10, wherein the instructions further cause the data processing hardware to:

determine that a second B-tree index page of the database is evicted from a shared buffer cache; and responsive to determining that the second B-tree index page is evicted from the shared buffer cache:

generate, using the second B-tree index page, a second list of dead tuples;

determine, based on each tuple in the second list of dead tuples, a second transaction identifier;

delete, from the second B-tree index page, each tuple in the second list of dead tuples; and generate, using the second transaction identifier, a second write-ahead logging record for the deletion of each tuple in the second list of dead tuples.

13. The system of claim 12, wherein the instructions that cause the data processing hardware to determine that the second B-tree index page of the database is evicted from a shared buffer cache further cause the data processing hardware to:

push a buffer tag uniquely identifying the second B-tree index page of the database into a queue;

read, from the queue, the buffer tag; and responsive to reading the buffer tag, retrieve the second B-tree index page.

14. The system of claim 10, wherein the instructions further cause the data processing hardware to:

determine that a second B-tree index page of the database is full and has at least one dead tuple; and responsive to determining that the second B-tree index page is full and has at least one dead tuple:

generate, using the second B-tree index page, a second list of dead tuples;

determine, based on each tuple in the second list of dead tuples, a second transaction identifier;

delete, from the second B-tree index page, each tuple in the second list of dead tuples; and generate, using the second transaction identifier, a second write-ahead logging record for the deletion of each tuple in the second list of dead tuples.

15. The system of claim 10, wherein the instructions further cause the data processing hardware to:

determine that a second threshold amount of tuples of a plurality of B-tree index pages are dead; and delete each tuple in the list of dead tuples is further based on determining that the second threshold amount of tuples of the plurality of B-tree index pages are dead.

16. The system of claim 15, wherein the instructions that cause the data processing hardware to determine that the second threshold amount of tuples of the plurality of B-tree index pages are dead further cause the data processing hardware to compare a current cumulative count of dead tuples with a past cumulative count of dead tuples.

17. The system of claim 10, wherein the instructions further cause the data processing hardware to:

determine, using the one or more hint bits, that the threshold amount of tuples of a second B-tree index page are dead;

responsive to determining that the threshold amount of tuples of the second B-tree index page are dead, generating, using the B-tree index page, a second list of dead tuples;

while generating the second list of dead tuples, determine that a threshold amount of time has passed; and responsive to determining that the threshold amount of time has passed, halt generation of the second list of dead tuples.

18. The system of claim 10, wherein:

the B-tree index page is stored at a shared buffer cache; and the shared buffer cache stores a plurality of B-tree index pages for a plurality of databases.

19. A non-transitory computer-readable storage medium encoded with instructions that, when executed by one or more processors of a computing system, cause the one or more processors to:

obtain one or more hint bits for a B-tree index page of a database, each hint bit of the one or more hint bits representing a status of a corresponding tuple of the B-tree index page;

determine, using the one or more hint bits, that a threshold amount of tuples of the B-tree index page are dead;

responsive to the determination that the threshold amount of tuples of the B-tree index page are dead:

generate, using the B-tree index page, a list of dead tuples;

determine, based on each tuple in the list of dead tuples, a transaction identifier;

delete, from the B-tree index page, each tuple in the list of dead tuples; and generate, using the transaction identifier, a write-ahead logging record for the deletion of each tuple in the list of dead tuples; and propagate the write-ahead logging record to one or more secondary nodes of the database to enable the one or more secondary nodes to delete each tuple in the list of dead tuples.

20. The non-transitory computer-readable storage medium of claim 19, wherein the instructions further cause the one or more processors to:

determine that a second B-tree index page of the database is evicted from a shared buffer cache; and responsive to determining that the second B-tree index page is evicted from the shared buffer cache:

generate, using the second B-tree index page, a second list of dead tuples;

determine, based on each tuple in the second list of dead tuples, a second transaction identifier;

delete, from the second B-tree index page, each tuple in the second list of dead tuples; and generate, using the second transaction identifier, a second write-ahead logging record for the deletion of each tuple in the second list of dead tuples.

* * * * *